United States Patent [19]

Bobroff et al.

[11] Patent Number: 5,059,090

[45] Date of Patent: Oct. 22, 1991

[54] TWO-DIMENSIONAL POSITIONING APPARATUS

[75] Inventors: Norman Bobroff, Katonah, N.Y.; Rodney A. Kendall, Ridgefield, Conn.

[73] Assignee: International Business Machines Corp., Armonk, N.Y.

[21] Appl. No.: 466,089

[22] Filed: Jan. 16, 1990

[51] Int. Cl.$^5$ .............................................. B23Q 7/00
[52] U.S. Cl. ................................... 414/749; 414/778; 414/917; 269/73
[58] Field of Search ............... 414/754, 778, 779, 749, 414/589, 917; 269/73; 108/20, 137, 138

[56] References Cited

U.S. PATENT DOCUMENTS

| | | |
|---|---|---|
| 893,068 | 7/1908 | Gay . |
| 2,244,215 | 6/1941 | Pescara . |
| 2,521,895 | 9/1950 | Bunting . |
| 3,376,755 | 4/1968 | Joyce, Jr. . |
| 3,948,467 | 4/1976 | Krusius . |
| 4,400,985 | 8/1983 | Bond . |
| 4,417,843 | 11/1983 | Bonga .......................... 269/73 X |
| 4,610,442 | 9/1986 | Oku et al. .................... 269/73 |
| 4,699,560 | 10/1987 | Ostermeyer et al. ........... 414/917 X |

FOREIGN PATENT DOCUMENTS

| | | |
|---|---|---|
| 0314839 | 5/1989 | European Pat. Off. . |
| 2190187 | 1/1974 | France . |
| 54-081576 | 9/1979 | Japan . |
| 61-270044 | 4/1987 | Japan . |
| 2067932 | 8/1981 | United Kingdom . |

OTHER PUBLICATIONS

IBM Technical Disclosure Bulletin, vol. 30, No. 5, Oct. 1987, pp. 299–300, "High Speed Micro-Positioner".

Primary Examiner—Robert J. Spar
Assistant Examiner—Donald W. Underwood
Attorney, Agent, or Firm—Scully, Scott, Murphy & Presser

[57] ABSTRACT

A two-dimensional positioning mechanism, comprising a moveable platform, a first translating device connected to the platform to move the platform in a first direction, and a second translating device connected to the platform to move the platform in a second direction orthogonal to the first direction. The first translating device includes first and second links, each of which is pivotally connected to the platform, and a first linear actuator pivotally connected to the first and second links to move those links in the first direction. The first and second links, the moveable platform and the linear actuator form a pivotal parallelogram structure to maintain the orientation of the platform substantially constant during movement thereof. Preferably, the positioning mechanism further includes a control system connected to the first and second translating devices to control those translating devices to move the platform from a first position to a second position. This control system preferably also controls the translating devices to move the platform on a predetermined path as the platform moves from one position to the next.

18 Claims, 1 Drawing Sheet

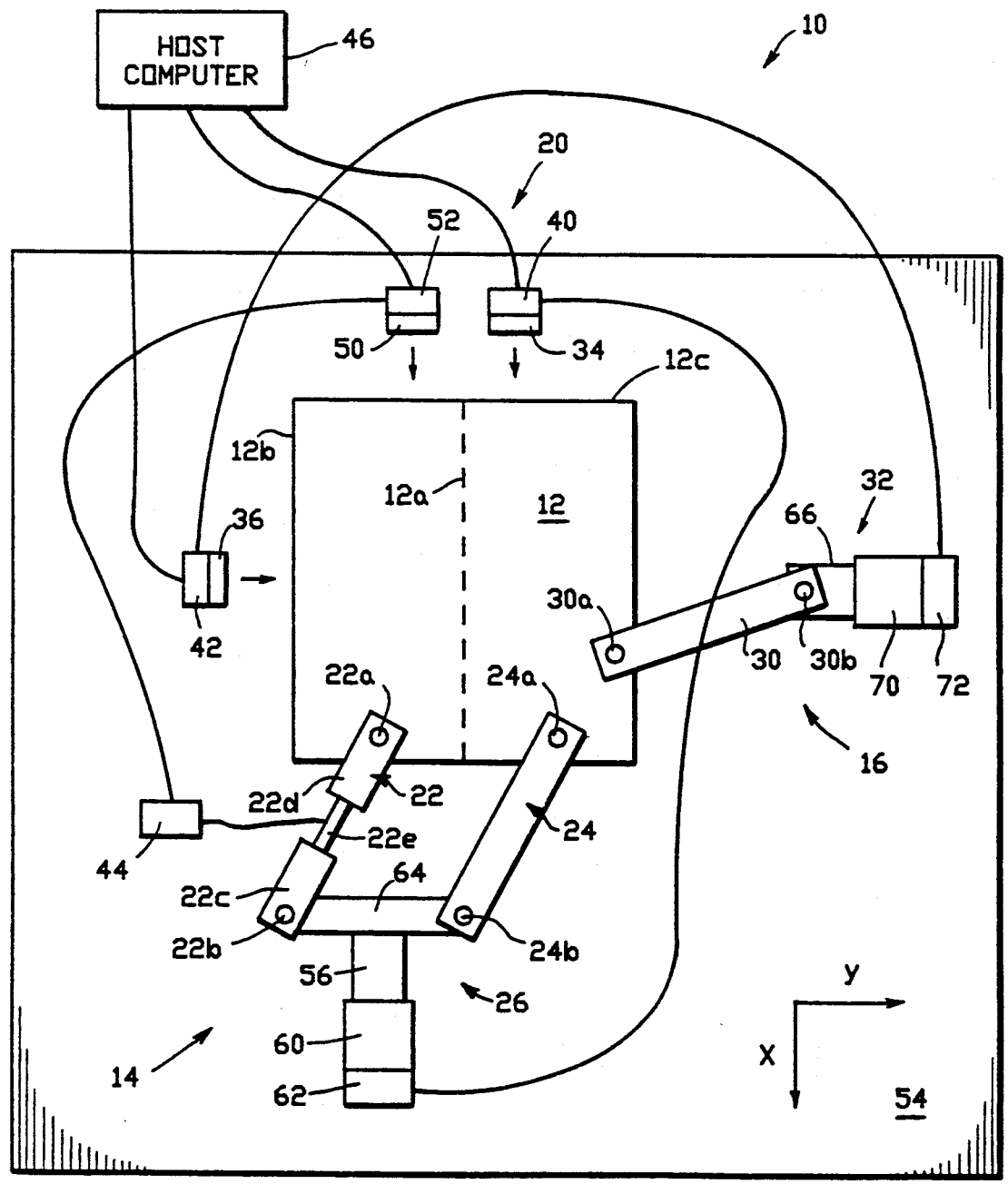

TWO-DIMENSIONAL POSITIONING APPARATUS

BACKGROUND OF THE INVENTION

This invention generally relates to positioning mechanisms; and more specifically, to a mechanism for moving a platform in two orthogonal directions with a high degree of precision.

Some industrial applications require that a workpiece be moved along two orthogonal directions with a very high degree of precision. For example, in the fabrication of integrated circuits, a wafer may be moved through a series of different positions, at each of which a multitude of operations are performed on the wafer. It is important that each operation be performed on a specific, often extremely small, area of the wafer; and to ensure that this is done, the wafer must be located precisely in each of its series of positions. In addition, operations may be performed on the wafer as it is being moved, for instance lithographic exposure, to score a line on the wafer or to deposit or remove material over a predetermined, often very narrow path or line on the wafer. To accomplish this, it is important that the wafer itself be moved with a very high degree of accuracy along a predetermined path.

Various prior art devices are known to move a workpiece with a high degree of precision. Typically, these prior art devices employ complicated mechanical systems involving a large number of machine components, bearings, guideways and lead screws to move the workpiece as desired. These complicated mechanical systems are comparatively expensive and, moreover, as the mechanical elements of the systems wear with use, the precision of the systems decrease.

SUMMARY OF THE INVENTION

An object of this invention is to improve two-dimensional positioning apparatus.

Another object of the present invention is to provide a two-dimensional positioning apparatus that may be used to move a workpiece precisely through a predetermined pattern, without requiring a complex mechanical system.

A further object of this invention is to use highly precise position sensors, rather than complicated mechanical systems, to move a workpiece precisely through a predetermined pattern.

Still another object of the present invention is to provide a parallelogram structure, which is used to help maintain the orientation of a platform constant as the platform moves, with a link having an adjustable length, and to adjust the length of that link as the platform moves to further help maintain the orientation of the platform constant.

These and other objects are attained with a two-dimensional positioning mechanism, comprising a moveable platform, first translating means connected to the platform to move the platform in a first direction, and second translating means connected to the platform to move the platform in a second direction orthogonal to the first direction. The first translating means includes first and second links, each of which is pivotally connected to the platform, and a first linear actuator pivotally connected to the first and second links to move those links in the first direction. The first and second links, the moveable platform and the linear actuator form a pivotal parallelogram structure to maintain the orientation of the platform substantially constant during movement thereof.

Preferably, the positioning mechanism further includes control means connected to the first and second translating means to control those translating means to move the platform from a first position to a second position. This control means preferably also controls the translating means to move the platform on a predetermined path as the platform moves from one position to the next. To do this, the control means employs first and second processor-sensor units to monitor the location of the platform, specifically first and second lateral edges thereof, as the platform moves. If, during this movement, the platform is not in the location at which it should be, the control means generates correction signals and transmits those signals to the first and second translating means to operate those translating means to move the platform to the location in which it should be.

In addition, even with the above-mentioned parallelogram structure, the orientation of the platform may tend to change slightly, or yaw, during movement of the platform. To compensate for, or to prevent, this yaw, preferably one of the links of the first translating means has an adjustable length, and the positioning mechanism further includes means to sense yaw in movement of the platform, and upon sensing such yaw, to adjust the length of this adjustable link to return the platform to its desired orientation.

Further benefits and advantages of the invention will become apparent from a consideration of the following detailed description given with reference to the accompanying drawing, which specifies and shows preferred embodiments of the invention.

A BRIEF DESCRIPTION OF THE DRAWING

The sole Figure in the drawing generally illustrates a positioning apparatus according to the present invention.

DETAILED DESCRIPTION OF THE PREFERRED EMBODIMENTS

The Figure illustrates positioning apparatus 10 generally comprising platform 12, first translating means 14 and second translating means 16, and preferably the positioning apparatus further comprises control means generally referenced at 20. More specifically, the first translating means includes first and second links 22 and 24 and linear actuator 26, the second translating means includes link 30 and linear actuator 32, and the control means includes sensors 34 and 36 and processors 40 and 42. With the embodiment of the invention shown in the Figure, the first translating means further includes link controller 44, and the control means further includes host processor 46, sensor 50 and processor 52.

Platform 12 is provided to hold a workpiece or other object, and the platform is supported for movement in two orthogonal directions, represented in the Figure by the x and y axes and referred to herein as the x and y directions respectively. Platform 12 may have any suitable shape and size, although commonly it has a flat, rectangular or square shape, and the platform may be provided with any suitable means (not shown) to hold a workpiece securely on the platform in a fixed position relative thereto. Also, the platform may be supported in any acceptable manner; and, for example, the platform may be positioned over a larger planar support surface 54 and supported by an air bearing or by slide bearings for movement over that surface.

First translating means 14 is connected to platform 12 to move the platform in a first direction, such as the x direction; and second translating means 16 is connected to the platform to move the platform in a second direction orthogonal to the first direction, such as the y direction. More specifically, first and second links 22 and 24 are each pivotally connected to the platform at 22a and 24a respectively, and pivotally connected to linear actuator 26 at 22b and 24b respectively; and link 30 is pivotally connected to the platform at 30a, and to linear actuator 32 at 30b. Actuator 26 may be operated to move links 22 and 24 in the x-direction, upward and downward as viewed in the Figure, thereby to move the platform likewise in the x direction. Similarly, actuator 32 may be operated to move link 30, and thereby to move the platform, in the y-direction, leftward and rightward as viewed in the Figure. As links 22 and 24 are moved upward or downward to move the platform, link 30 pivots about the pivot points 30a and 30b; and, if pivot point 30b remains at a fixed location, link 30 causes the platform to also move in the y direction. Similarly, as link 30 is moved to move the platform in the y direction, links 22 and 24 pivot about connections 22b and 24b respectively; and if connections 22b and 24b remain at fixed locations, links 22 and 24 cause the platform to move in the x direction.

With the above-described arrangement, links 22 and 24, moveable platform 12 and linear actuator 26 form a pivotal parallelogram structure that maintains the orientation of the platform substantially constant during movement of the platform. To elaborate, the orientation of the platform can be considered as the angle formed between an axis fixed on the platform, such as the central longitudinal axis 12a of the platform, and another axis, such as the x-axis shown in the Figure, that remains fixed relative to the environment in which the platform is located. These two axes are parallel to each other as shown in the Figure; and the parallelogram structure formed by links 22 and 24, platform 12 and linear actuator 26 maintains these axes substantially parallel during movement of the platform.

Linear actuators are available that can move an object to a desired position with an accuracy of 10 nanometers, and such actuators may be used in this invention. In the embodiment of the invention illustrated in the Figure, linear actuator 26 comprises moveable member 56, electric motor 60, motor controller 62, and connecting member 64; and actuator 32 comprises moveable member 66, electric motor 70 and motor controller 72. Moveable member 56 is supported for linear movement in the x-direction, and this moveable member is connected to links 22 and 24, via connecting member 64, to move those links along the x direction. Motor 60 is connected to moveable member 56 to move this member upward and downward as viewed in the Figure, and controller 62 is connected to motor 60 to control that motor so as to move the moveable member 56 selectively in response to signals transmitted to that controller.

Moveable member 66 is supported for linear movement in the y-direction, and this moveable member is connected to link 30 to move that link along the y direction. Motor 70 is connected to moveable member 66 to move that member to the left and right as viewed in the Figure; and, in turn, controller 72 is connected to motor 70 to control that motor so as to move the moveable member 66 selectively in response to signals transmitted to the controller.

Moreover, preferably each of the motors 60 and 70 comprises a servo motor having an output shaft, and each of the controllers 62 and 72 actuates the associated motor to rotate its output shaft either clockwise or counterclockwise in response to signals transmitted to the controller from control means 20.

Numerous other specific types of linear actuators may be employed in apparatus 10. For example, these actuators may include hydraulic or pneumatic cylinders, and a controller to extend or retract the rods of the cylinders in response to signals transmitted to those controllers.

Control means 20 is connected to first and second translating means 14 and 16 to control those translating means to move platform 12 through a series of positions; and preferably, the control means controls the translating means not only to do this, but also to move the platform on a predetermined path as the platform moves through that series of positions. To do this, the control means monitors the location of the platform as the platform moves from one position to another; and if the platform is not in the location at which it should be, the control means generates correction signals and transmits those correction signals to the first and second translating means, specifically controllers 62 and 72 thereof, to operate those translating means to move the platform toward or to the location in which it should be.

More specifically, at each of a multitude of times during movement of the platform, sensors 34 and 36 sense the actual position of the platform and transmit to processors 40 and 42 signals representing that actual position. Processors 40 and 42 compare the actual position of the platform to the desired position thereof at that time; and if these two positions are different, the processors generate and transmit control signals to the linear actuators 26 and 32 to operate those actuators to move the platform toward or into the desired position.

Even more specifically, at each of a multitude of points in time, preferably at regular intervals, during this movement of the platform, sensor 36 senses the actual position of the left lateral edge 12b of the platform, and the sensor transmits to processor 42 a signal indicating that actual position. Processor 42 determines the desired position of the left lateral edge of the platform at this point in time. If the actual sensed position of edge 12b is to the left of the desired position, processor 42 generates and transmits to motor controller 72 a signal causing that controller to actuate motor 70 to pull link 30 to the right, thereby to pull the platform to the right. However, if the actual sensed position of edge 12b is to the right of the desired position, processor 42 generates and transmits to motor controller 72 a signal causing that controller to actuate motor 70 to push link 30 to the left, thereby to push the platform to the left.

Similarly, at each of a multitude of points in time, also preferably at regular intervals, during movement of the platform, sensor 34 senses the actual position of the top lateral edge 12c of the platform, and the sensor transmits to processor 40 a signal indicating the actual position of edge 12c. Processor 40 determines the desired position of the top lateral edge of the platform at these points in time. On the one hand, if the actual sensed position of edge 12c is above the desired position, processor 40 generates and transmits to linear actuator 26, specifically controller 62, a signal causing that actuator to pull links 22 and 24 downward and thus to pull the platform downward. On the other hand, if the actual sensed position of edge 12c is below the desired position, processor 40 generates and transmits to linear actuator 26, specifically controller 62, a signal causing that actuator to push links 22 and 24 upward to push the platform upward.

While platform 12 moves from one position to another, the desired location of the platform may, and typically does, change in both the x and y directions. Hence, preferably, each of the processors 40 and 42 includes means to determine the desired coordinate data—specifically, the desired x coordinate of the top lateral edge 12c and the desired y coordinate of the left lateral edge 12b, respectively, of the platform—while the platform is moving. For example, the processors may be programmed to determine the desired coordinate values according to given equations, or the processors may be provided with look-up tables to determine the desired coordinate values at various points during a given period of time. Host computer 46 is used to transmit to processors 40 and 42 any data or programs needed to determine the desired coordinate values. Preferably, each processor includes a clock means that generates timing signals to enable the processor to keep track of time during movement of the platform. Alternatively, these timing signals may be transmitted to the processors from another device, such as the host computer.

Sensors 34 and 36 may comprise any suitable position sensing devices. Preferably, though, each of the sensors is or includes an interferometer, and the sensors are rigidly secured on support surface 54. Interferometers are available that can sense the position of an object with an accuracy of less than two nanometers, and such devices may be used in this invention. Likewise, processors 40 and 42 may be any suitable processing devices. Sensor-processing units are commercially available that may be used as sensor 34 and processor 40, and as sensor 36 and processor 42, and suitable sensor-processing units include Hewlitt Packard's 5527 System, and Zygo Corporation's Axion 2-20.

As previously mentioned, the parallelogram structure formed by platform 12, links 22 and 24 and linear actuator 26 ensure that the orientation of the platform remains substantially constant as the platform moves. However, if the distance between the center of connecting points 22a and 22b is not precisely equal to the distance between the centers of connecting points 24a and 24b, then the orientation of the platform may tend to pivot slightly, or yaw, during movement of the platform. To compensate for, or to prevent, this yaw, link 22 of first translating means 14 has an adjustable length, and apparatus 10 comprises means, including controller 44, sensor 50 and processor 52, to detect yaw in the movement of platform 12 and, upon sensing such yaw, to adjust the length of link 22 to return the platform to its desired orientation.

More particularly, as shown in the Figure, link 22 comprises first and second sections 22c and d, each of which has a substantially constant length, and third section 22e, which has an adjustable length. One end of link section 22c is pivotally mounted on linear actuator 26, and the other end of this link section is secured to a first end of third section 22e. A second end of section 22e is secured to one end of link section 22d, and the other end of this latter link section is pivotally mounted on platform 12. Mid section 22e comprises an actuator such as a piezo transducer, the length of which is a function of the voltage difference applied across the transducer.

Controller 44 is connected to link 22 to adjust the length thereof; and with the embodiment of the invention shown in the Figure, this is done by applying a variable voltage difference across piezo section 22e. The variable voltage is supplied to actuator 22e by controller 44 in response to signals generated by sensor 50 and processor 52.

Other types of extensible links may be used in the practice of the present invention, and other types of controllers may be used to extend or adjust the length of that link. For example, link 22 may be or include an extensible hydraulic or pneumatic cylinder, and controller 44 may be a hydraulic or pneumatic control valve used to control the extensible cylinder in response to the signal or signals transmitted to the control valve from processor 52.

Link sections 22c and d, as well as links 24 and 30 and connecting member 64, may be made of any suitable material, such as aluminum or a rigid plastic, and the links may be connected in place in any acceptable manner.

Sensor 50 and processor 52 operate in a manner very similar to sensors 34 and 36 and processors 40 and 42 to detect any deviation of platform 12 from a desired orientation, and if such a deviation is detected, to generate and to transmit to controller 44 a signal to operate that actuator to adjust the length of link 22 to return the platform to the desired orientation.

In particular, sensor 50 also preferably is an interferometer rigidly secured on platform 54; and at each of a multitude of times during movement of the platform, sensor 50, senses the actual position of the top lateral edge 12c of the platform and transmits to processor 52 a signal indicating that actual position. Processor 52 determines the desired position of the top lateral edge of the platform at these points in time. If the actual sensed position of edge 12c is above the desired position, processor 52 generates and transmits to controller 44 a signal causing actuator 22e to retract link 22 to thereby pivot the top edge of the platform counterclockwise. However, if the actual sensed position of edge 12c is below the desired position, processor 52 generates and transmits to controller 44 a signal causing actuator 22e to extend link 22, thereby to pivot the top edge of the platform clockwise.

Processor 52 is provided with means to determine the desired coordinate value, specifically the x-coordinate of top edge 12c of platform 12, during movement of the platform. Processor 52 may be programmed to determine the desired coordinate value according to a given equation, or the processor may be provided with a look-up table to determine the desired coordinate values at various points during a given period of time, and host computer 46 may be used to transmit to processor 52 any data or programs needed to determine the desired coordinate values. The processor may be provided with clock means that generates timing signals to enable the processor to keep track of time during movement of the platform, or these timing signals may be transmitted to the processor from another device such as the host computer.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

Having thus described the invention, what is claimed as new, and is desired to be secured by letters patent is:

1. A two-dimensional positioning mechanism comprising:
   a moveable platform having a given orientation;
   first translating means connected to the platform to move the platform in a first direction, and including
   i) first and second links, each of the links being pivotally connected to the platform, and wherein the first link has an adjustable length, and includes a link actuator connected to the first link to adjust the length of the first link, and
   ii) a first linear actuator pivotally connected to the first and second links, to move the links in said first direction; and
   second translating means connected to the platform to move the platform in a second direction orthogonal to the first direction;
   wherein the first and second links, the moveable platform and the first linear actuator form a pivotal parallelogram structure to maintain the orientation of the platform substantially constant during movement thereof;
   wherein the positioning mechanism further comprises control means including yaw control means to sense deviation of the platform from the given orientation, and connected to the link actuator to adjust the length of the first link to return the platform to the given orientation during movement thereof.

2. A positioning mechanism according to claim 1, wherein the control means is connected to the first and second translating means to control said translating means to move the platform from a first position to a second position.

3. A positioning mechanism according to claim 2, wherein the control means controls the first and second translating means to move the platform on a predetermined path from said first position to said second position.

4. A two-dimensional positioning mechanism comprising:
   a moveable platform having a given orientation;
   first translating means connected to the platform to move the platform in a first direction, and including
   i) first and second links, each of the links being pivotally connected to the platform, and
   ii) a first linear actuator pivotally connected to the first and second links, to move the links in said first direction; and
   second translating means connected to the platform to move the platform in a second direction orthogonal to the first direction and including
   i) a third link pivotally connected to the platform, and
   ii) a second linear actuator pivotally connected to the third link to move the third link in the second direction; and
   control means connected to the first and second translating means to control said translating means to move the platform from a first position to a second position;
   wherein the first and second links, the moveable platform and the first linear actuator form a pivotal parallelogram structure to maintain the orientation of the platform substantially constant during movement thereof.

5. A positioning mechanism according to claim 4, wherein:
   the first linear actuator includes
   i) a first electric motor,
   ii) means connecting the first electric motor to the first and second links, and
   iii) a first controller connected to the first electric motor to control operation thereof; and
   the second linear actuator includes
   i) a second electric motor,
   ii) means connecting the second electric motor to the third link, and
   iii) a second controller connected to the second electric motor to control operation thereof.

6. A positioning mechanism according to claim 5, wherein the control means includes:
   first means to sense the position of the platform in the first direction, to generate a first correction signal if the position of the platform in the first direction is different from a desired position, and to transmit the first correction signal to the first controller to actuate the first electric motor to move the first and second links and the platform in the first direction to said desired position; and
   second means to sense the position of the platform in the second direction, to generate a second correction signal if the position of the platform in the second direction is different from a desired position, and to transmit the second correction signal to the second controller to actuate the second electric motor to move the third link and the platform to said desired position in the second direction.

7. A two-dimensional positioning mechanism comprising:
   a moveable platform having a given orientation;
   first translating means connected to the platform to move the platform in a first direction, and including
   i) first and second links, each of the links being pivotally connected to the platform, and
   ii) a first linear actuator pivotally connected to the first and second links, to move the links in said first direction; and
   second translating means connected to the platform to move the platform in a second direction orthogonal to the first direction;
   wherein the first and second links, the moveable platform and the first linear actuator form a pivotal parallelogram structure to maintain the orientation of the platform substantially constant during movement thereof;
   the positioning mechanism further comprising control means connected to the first and second translating means to control said translating means to move the platform from a first position to a second position, the control means including
   i) first means to sense the position of the platform in the first direction, to generate a first correction signal if the position of the platform in the first direction is different from a desired position, and to transmit the first correction signal to the first translating means to operate the first translating means to move the platform to said desired position, and
   ii) second means to sense the position of the platform in the second direction, to generate a second correction signal if the position of the platform in the second direction is different from a desired position, and to transmit the second correction signal to the second translating means to operate the second translating means to move the platform to said desired position in the second direction.

8. A positioning mechanism according to claim 7, wherein:
the first means includes
i) a first sensor to sense the position of the platform in the first direction, and
ii) a first processor to determine the desired position of the platform in the first direction; and
the second means includes
i) a second sensor to sense the position of the platform in the second direction, and
ii) a second processor to determine the desired position of the platform in the second position.

9. A positioning mechanism according to claim 8, wherein:
the platform has first and second lateral sides;
the first sensor senses the position of the first lateral side of the platform; and
the second sensor senses the position of the second lateral side of the platform.

10. A positioning mechanism according to claim 8, wherein the desired positions of the platform in the first and second directions vary over a given period of time, and wherein:
the first processor includes means to determine the desired position of the platform in the first direction during said period; and
the second processor includes means to determine the desired position of the platform in the second direction during said period.

11. A two-dimensional positioning mechanism comprising:
a moveable platform having a given orientation;
first translating means connected to the platform to move the platform in a first direction, and including
i) first and second links, each of the links being pivotally connected to the platform, and the first link having an adjustable length,
ii) a first linear actuator pivotally connected to the first and second links, to move the links in said first direction, and
iii) a link controller connected to the first link to adjust the length thereof; and
second translating means connected to the platform to move the platform in a second direction orthogonal to the first direction;
wherein the first and second links, the moveable platform, and the first linear actuator form a pivotal parallelogram structure to maintain the orientation of the platform substantially constant during movement thereof.

12. A positioning mechanism according to claim 11, further comprising yaw control means to sense deviation of the platform from the given orientation, and connected to the link controller to operate the link controller to adjust the length of the first link to return the platform to the given orientation.

13. A positioning mechanism according to claim 12, wherein the yaw control means includes:
a yaw sensor to sense the position of the platform in a given direction; and
a processor to determine the desired position of the platform in said given direction.

14. A positioning mechanism according to claim 13, wherein the desired position of the platform in the given direction varies over a given period of time, and the processor includes means to determine the desired position of the platform in the given direction during said period.

15. A positioning mechanism according to claim 13, wherein:
the platform has a first lateral side; and
the yaw control means senses the position of said first lateral side and generates and transmits to the link controller a yaw correction signal when the position of the first lateral side of the platform is different from a desired position.

16. A positioning mechanism according to claim 15, wherein the yaw control means includes a processor to determine the desired position of the first lateral side of the platform.

17. A positioning mechanism according to claim 16, wherein:
the desired position of the first lateral side of the platform varies over a given period of time; and
the processor includes means to determine the desired position of the first lateral side of the platform during said given period of time.

18. A positioning mechanism according to claim 16, wherein:
the first link includes
i) a first section pivotally connected to the platform,
ii) a second section pivotally connected to the first linear actuator, and
iii) an adjustable length piezo section connected to and extending between the first and second sections of the link; and
the link controller is electrically connected to the first link to apply a variable voltage potential across the piezo section to vary the length thereof.

* * * * *